United States Patent [19]
Tocher

[11] Patent Number: 5,483,336
[45] Date of Patent: * Jan. 9, 1996

[54] SELF CORRECTING STEREOSCOPIC AUTO-RANGEFINDER

[75] Inventor: Angus J. Tocher, Calgary, Canada

[73] Assignee: VX Optronics, Calgary, Canada

[*] Notice: The portion of the term of this patent subsequent to Jan. 18, 2011, has been disclaimed.

[21] Appl. No.: 153,344

[22] Filed: Nov. 16, 1993

Related U.S. Application Data

[63] Continuation-in-part of Ser. No. 968,969, Oct. 30, 1992, Pat. No. 5,280,332.

[51] Int. Cl.⁶ .................. G01C 3/00; G01C 3/08
[52] U.S. Cl. .................. 356/3.15; 250/201.6; 250/201.8; 354/405; 354/408; 356/16; 356/19
[58] Field of Search .................. 356/1, 4, 16, 19, 356/3.15; 354/405, 408; 250/201.6, 201.8

[56] References Cited

U.S. PATENT DOCUMENTS

| | | | |
|---|---|---|---|
| 3,180,208 | 4/1965 | Swartz et al. | 88/2.7 |
| 3,459,478 | 8/1969 | Marasco et al. | 356/22 |
| 3,499,711 | 3/1970 | Argyle | 356/5 |
| 3,663,105 | 5/1972 | Anderson | 356/4 |
| 4,071,772 | 1/1978 | Leitz et al. | 250/558 |
| 4,465,366 | 8/1984 | Schmidt | 356/1 |
| 4,831,405 | 5/1989 | Hata et al. | 354/409 |
| 4,835,561 | 5/1989 | Matsui | 354/403 |
| 4,886,347 | 12/1989 | Monroe | 350/551 |

FOREIGN PATENT DOCUMENTS

| | | |
|---|---|---|
| 452827 | 11/1948 | Canada . |
| 549248 | 11/1957 | Canada . |

OTHER PUBLICATIONS

O. Burgess, "Applied Research Project: Passive Stereoscopic Rangefinder" dated Mar. 22, 1983 British Aerospace, Dynamics Group, Bristol Division.

*Primary Examiner*—Stephen C. Buczinski
*Attorney, Agent, or Firm*—Sheridan Ross & McIntosh

[57] ABSTRACT

A stereoscopic rangefinder is disclosed for determining the distance of a target object by measuring the angle of parallax of light scattered by the target. The rangefinder includes two arrays of photosensitive elements upon each of which a distinct target image is projected. A measurement of the pixel displacement between the two target images is used in measuring the angle of parallax. A novel computational scheme is included in the rangefinder wherein it is self-correcting with regard to mechanical shock and thermal influences such that a user need only "point and shoot." Further, the rangefinder is insensitive to target image blur and is embodied as a hand held rangefinding binocular having no moving parts.

6 Claims, 5 Drawing Sheets

SELF CORRECTING STEREOSCOPIC AUTO-RANGEFINDER

CROSS REFERENCE TO RELATED APPLICATION

This application is a continuation-in-part of U.S. application Ser. No. 07/968,969, filed Oct. 30, 1992 and assigned to the assignee hereof, now U.S. Pat. No. 5,280,332.

FIELD OF INVENTION

This invention relates to stereoscopic type electro-optical rangefinding devices and more particularly to such devices which are self-correcting for mechanical and/or thermal disturbances. This invention also relates to stereoscopic rangefinding devices which are auto-ranging, meaning that the human eyes are not employed to perform any critical ranging task.

BACKGROUND OF INVENTION

Stereoscopic type optical rangefinders derive target range by measuring the angle of parallax subtended by the target of interest and the left and right hand entrance windows whose spacing determines the baselength of the rangefinder. Stereoscopic rangefinders typically depend upon the human users perception of depth to compare the depth of a real target scene with that of an artificial reference image. Provision is made for the user to adjust the angle of view of either the real target scene, or the artificial reference image so that their apparent depth is the same. When this adjustment is made, the observed effect is that of the artificial reference image appearing to rush up to, or alongside the target scene. The position of the adjuster may then be translated to the angle of parallax, or range to the target.

Stereoscopic rangefinders differ fundamentally from coincidence type rangefinders in that the former measures the viewing angle of images between separated optical channels, while the latter seeks to measure the alignment of dual or split images merged into a single optical channel. As such, coincidence type optical rangefinders generally employ a central beamsplitter to merge two beams of light from separated entrance windows whereas stereoscopic rangefinders generally lack this beamsplitter element. Also of importance is that although most persons are readily capable of aligning dual or split images presented to the eye, stereoscopic rangefinders are not used effectively by all persons and generally training and familiarity are required before proficiency is attained. This is the main reason few stereoscopic rangefinders are publicly available while numerous types and brands of coincidence type rangefinders exist.

Optical rangefinders, and in particular, stereoscopic rangefinders have suffered from many shortcomings some of which follow:

1. Accuracy of ranging is dependent upon the users ability which can vary widely from one user to the next.

2. Existing devices are generally sensitive to slight movement of optical components caused by mechanical shock, or thermal influences which can result in loss of range accuracy.

3. Devices which are less sensitive to movement of optical elements generally substitute mirror reflectors with larger and heavier prisms.

4. Devices which employ a light deviating element to adjust the angle of view of either the real target scene or the artificial reference image also use mechanisms to translate this movement to a scale from which range may be read. These mechanisms are costly and are susceptible to wear and deformation of components which can also result in range inaccuracies.

5. Accuracy generally depends on the user's depth perception and particularly on his ability to judge relative distances. This ability may vary significantly from one person to the next.

U.S. Pat. No. 3,180,208 entitled "Optical Range Finding Device", to Swartz and Marasco (1965) for example, teaches a stereoscopic rangefinder where the operator alters the viewing angle of the real target scene by adjusting a light deviator, or compensator. In this example, the viewing angle of the artificial reference image, or stereo reticle pattern is fixed although in practice, the appearance is that the artificial reference image moves to meet the target. Although care has been taken in the design of the compensator and associated mechanism which reads the position of the compensator using anti-backlash gears, many moving parts are involved. This mechanism, apart from being costly, cannot avoid introducing range inaccuracies from wear, and mechanical or thermal deformations.

Another example of a stereoscopic rangefinder configured as a binocular is U.S. Pat. No. 4,886,347 entitled "Range-Finding Binocular", to Monroe, (1989). Different from Swartz and Marasco, this rangefinder provides for a fixed viewing angle to the target, and an adjustable viewing angle of the artificial reference image, in this case, an illuminated "range-mark". Adjustment of the range-mark is made by a fine gun screw driven by a reversible DC motor which also includes a position sensor whereby the position of the range-mark may be determined resulting in the apparent range of the real target. This system suffers from the problems associated with the use of mechanical components and with the problem of shifting optical elements by mechanical shock or thermal deformations which are otherwise indistinguishable from changes in the actual parallax angle of the target of interest. In other words, unlike the Swartz invention where the artificial reference images enter the visual optical system with a fixed parallax angle, Monroe's invention has no fixed reference and must therefore rely on very high optical and mechanical stabilities.

Still another example of a stereoscopic rangefinder also configured as a binocular is U.S. Pat. No. 4,071,772 to Leitz et al. (1978), entitled, "Apparatus for Measurement of Mechanical Aberrations Affecting Stereoscopic Image Analysis". This invention uses a spatial referencing system for producing laterally stable marker beams, and a common oscillating grating structure and drive means. As the grating structure is oscillated back and forth in the reference mark and target images, light intensities registered by photodetectors will vary in time with the motion of the structure.

In the device of the present invention a fundamentally different system is used to directly measure target image, and reference mark image separations, independent of any oscillating measurement structure, or optical grating. In the device of the present invention, no moving elements are involved in the calculation of target range which would otherwise be costly and subject to friction and wear. U.S. Pat. No. 4,465,366 entitled, Device for the Photo-electric Determination of the Position of at Least One Focal Plane of an Image, to Schmidt (1984), also describes a ranging system using an oscillating grating structure similar to the cited Leitz invention.

A final example of another stereoscopic rangefinder is described in an article prepared by the Optics Research Department of British Aerospace entitled, "Applied Research Project Passive Stereoscopic Rangefinder", (1983) This article describes a stereoscopic rangefinder using dual photodetectors, and image correlation and processing techniques to measure a target angle of parallax. Mechanical and thermal stability is achieved in part through the use of a single common objective lens through which first and second channel target beams pass. It is assumed that the use of a single objective lens will overcome the problem of objective lens movement. Stability is also achieved by the use of diffraction alignment systems which use the principle of Young's Fringes. One of such systems may be placed at one location in the optical system to record and by some means, (not described), correct for movement of beamsplitter, mirror and photodetectors, and at another location, to correct for movement of the two primary mirrors. No explanation is offered how interference patterns produced by such an alignment system on the photodetectors may be analyzed, and more importantly, separated from the target scene images. Also, although in this particular system, the use of a single objective lens may overcome the problem of lens movement, it requires that the lens be centralized between the first and second optical channels. To accommodate any reasonable field of view in such a system, the primary mirrors and entrance windows would be necessarily large which may be impractical, at least for use within a hand-held binocular.

More to the point is that in the device of the present invention, a fundamentally different system is used to correct for movements of elements of the ranging system including objective lenses, and photodetectors. This system is direct, and does not require the analysis of diffraction patterns produced by diffraction alignment systems introduced at different locations in the optical system. Further, the device of the present invention clearly provides means for extracting, and using information from the photodetectors to correct for movements of elements involved in the measurement of range.

OBJECTS OF THE INVENTION

It is therefore the object of the present invention to provide a low cost stereoscopic rangefinder which has the following improvements:

1. Mechanical Simplicity; having no moving parts and therefore increased accuracy and reliability, and lower production costs.

2. Resilience; a simple fixed angle of parallax referencing system is included which permits insensitivity of the invention to mechanical or thermal movements of elements expected under normal field use.

3. Optical Simplicity; using a minimum of optical elements, a simple angle of parallax referencing system, and a non-optical computational system for separating the real target scene images from the artificial reference images, the optical complexity and therefore production costs are minimized.

4. Ease of Use; by introducing a photo-electric system for measuring the target range, the user's operation is simply, "point and shoot". This ease of use combined with mechanical and optical simplicity makes the invention suitable for configuration as a hand-held rangefinding binocular.

5. High Accuracy and Reliability; the combination of a photo-electric system for resolving the target angle of parallax, a simple spatial referencing system, and a unique method of calibration and range measurement, affords high accuracy and reliability even under common rough field use.

6. Insensitivity to Blur Caused by Hand Tremor, Target Motion, and Air Turbulence; the photo-electric system allows simultaneous capture of target images on separated photo-detectors and thereby allows and even benefits from certain levels of symmetric blurring.

7. Low Cost; mechanical and optical simplicity facilitates low production costs especially as an added capability for professional or recreational style binocular products.

SUMMARY OF INVENTION

The present invention is directed toward a stereoscopic apparatus for measuring a parallax angle subtended by a target of interest and left and right hand entrance windows which each receive an incident beam of radiation from the target object of interest. This measured parallax angle can then be used to determine the range or distance of the target of interest.

In brief, a stereoscopic ranging system is provided which includes essentially two optical systems. The first system includes separated left and right hand optical channels for receiving target scene radiation and for receiving radiation from a second system which provides artificial spatially fixed points. This second system essentially joins the left and right hand channels of the first system and insures consistent range measurements should the system be subjected to mechanical shock or thermal variations.

The spatial referencing system itself is designed for minimum cost and maximum stability to insure that beams of radiation entering the separated left and right hand optical channels will have a fixed, but not necessarily parallel, angular relationship.

Photo-electric sensors are employed which receive both the target scene images and the reference system images and by way of mathematical correlation, computes target scene and reference image separations between the photo-electric sensors. These separations are then used to calculate angle of parallax of the target of interest, and to correct for minor movements of optical elements including movements of the photo-electric sensors.

Finally, a means is disclosed which reduces the effect of the target scene images on the photo-electric sensors making it possible to extract the reference system images from the target scene images.

Further objects and advantages of this invention will become apparent from consideration of the following description and accompanying drawings.

DETAILED DESCRIPTION OF THE INVENTION

Figure 1:
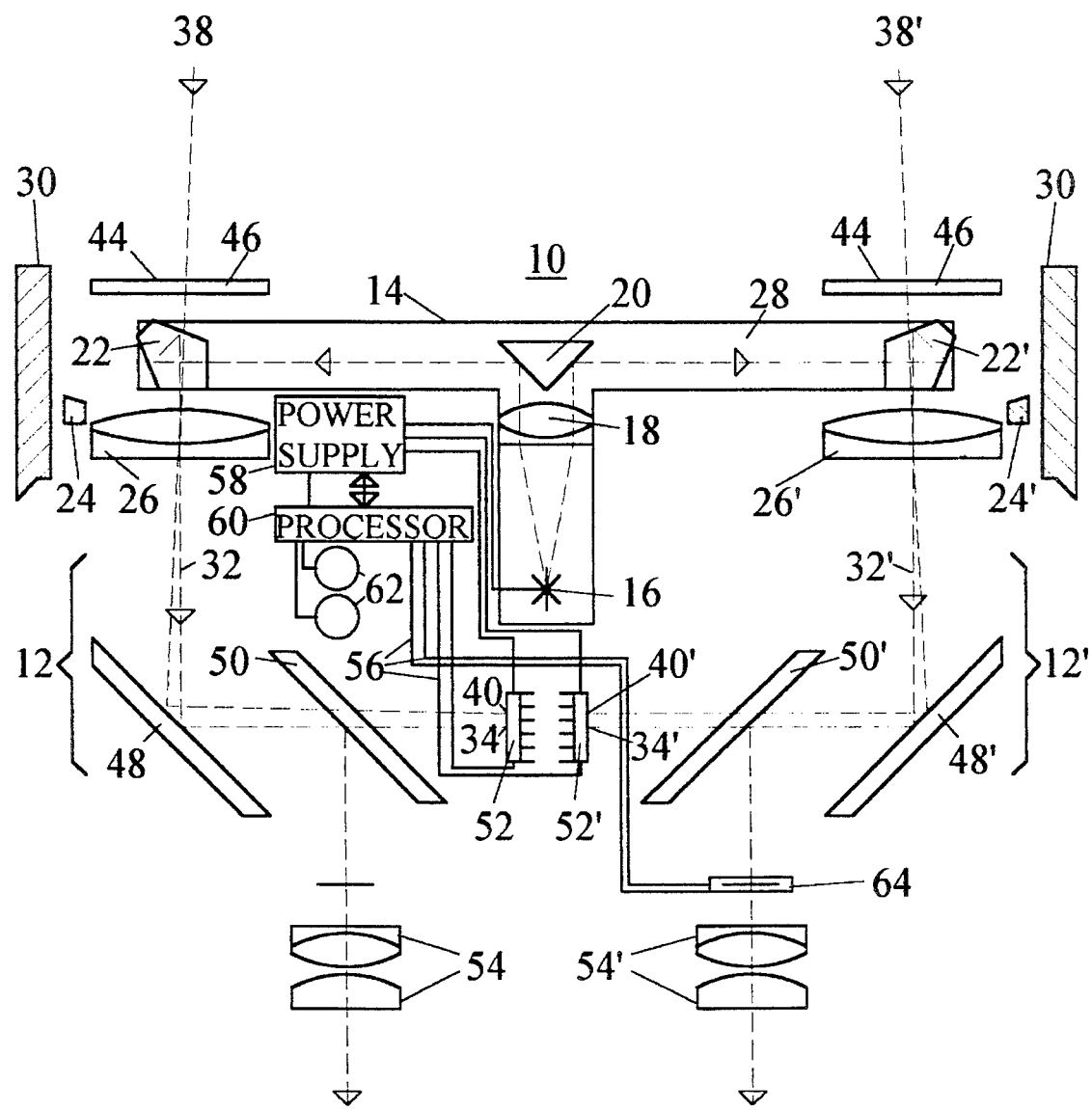
FIG. 1 is a pictorial plan view, not drawn to scale of a binocular embodiment of the invention illustrating both the referencing system and the main right and left hand binocular pathways. Image erecting prisms are assumed but not shown in order to simplify interpretation of the drawing.

FIG. 1 illustrates a binocular embodiment of a self-correcting stereoscopic auto-rangefinder, generally indicated as invention 10, and includes a housing means 30, which contains a spatial referencing means 14, and first and second optical channels 12 and 12'. Housing means 30 also contains first and second channel photodetector means 52 and 52', support electronics including electronic circuitry means 56, power supply means 58, processor means 60, control means 62, and display means 64. A scene reduction means 44 is also included which allows information from both a target scene and from the spatial referencing means 14 to be processed sequentially on photodetector means 52 and 52'.

Spatial referencing means 14 includes reference marker means 16 such as an LED (light emitting diode), laser diode, or other sources of illumination, reference marker optics 18 for receiving and collimating if necessary, radiation emitted by reference marker means 16, reference marker beam dividing means 20 for dividing said radiation into separated first and second channel marker beams 32 and 32', and for directing said marker beams 32 and 32' to first and second channel stable reference marker reflecting means 22 and 22' such as suitably small pentaprisms or penta-reflectors. Elements of the spatial referencing means 14 are mounted for mechanical stability on a stable optical mounting means 28 which may be separate from, or integral to housing means 30. Marker beams 32 and 32' are directed from stable reference marker reflecting means 22 and 22' into first and second channel entrance windows 24 and 24' of first and second optical channels 12 and 12' respectively. Entrance windows 24 and 24' also receive first and second channel target beams 38 and 38' emanating from the target object sighted for ranging. Both the marker beams 32 and 32', and the target beams 38 and 38' will then be directed respectively by first and second channel reflecting means 48 and 48' to first and second channel beamsplitting means 50 and 50'. Beamsplitting means 50 and 50' then divide marker beams 32 and 32' and target beams 38 and 38', and direct a portion of this radiation to image onto first and second channel photodetector means 52 and 52' and a portion of this radiation towards first and second channel eyepiece optics 54 and 54' for visual observation of the target of interest. First channel marker beam 32 and first channel target beam 38 pass through first channel objective lens 26 and form images onto first channel photodetector means 52, while second channel marker beam 32' and second channel target beam 38' pass through objective lens 26' and form images onto second channel photodetector means 52'.

Figure 2:
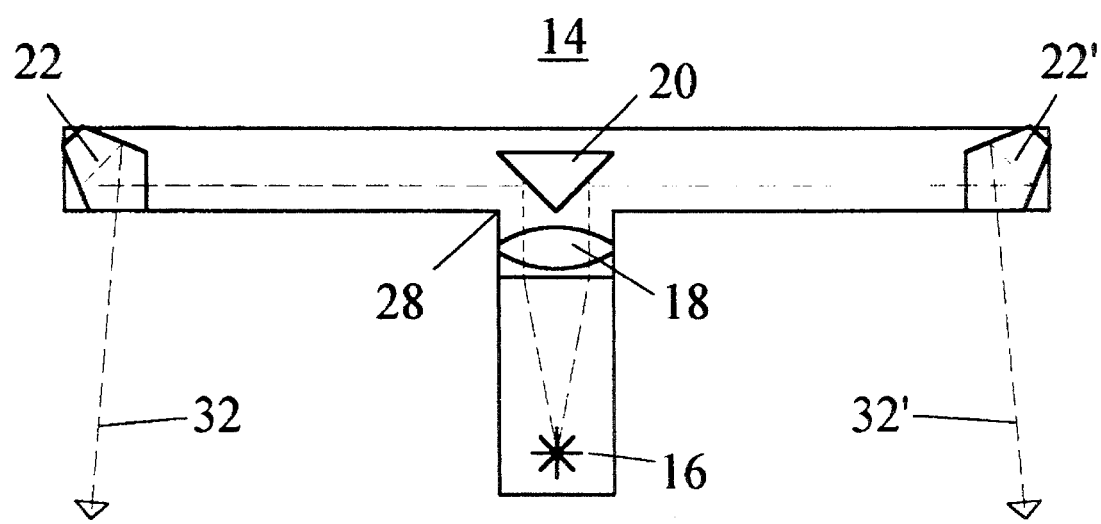
FIG. 2 is also a plan view, of a simplified referencing system for directing reference beams of radiation into the separated left and right hand optical channels.

FIG. 2 illustrates one form of spatial referencing means 14, to introduce first and second channel marker beams 32 and 32' into first and second optical channels 12 and 12'. This simple arrangement is possible in that for invention 10, it is not imperative that marker beams 32 and 32' are parallel, only that their lateral angular relationship be stable. This reduces the optical complexity of spatial referencing means 14 and in particular, reduces the fabrication demands on reference marker beam dividing means 20. The divergence of first and second channel marker beams 32 and 32' is exaggerated in FIG. 2 to illustrate this point.

Figure 3:
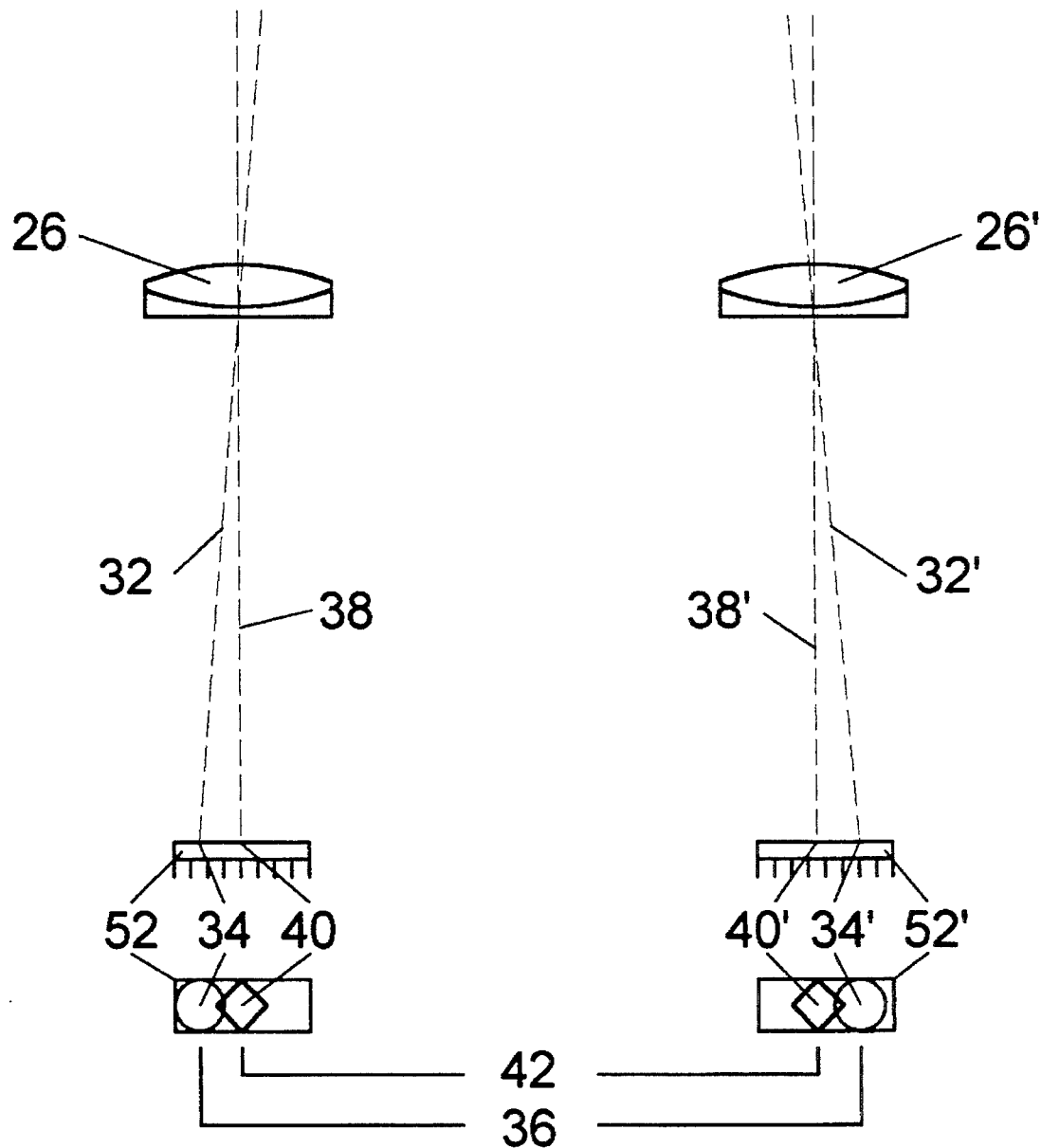
FIGS. 3, 4 and 5 are schematic representations of the target scene radiation and the reference marker radiation entering the left and right channel entrance windows and forming images onto the left and right hand photo-electric sensors. These figures are used to convey the principles of calibration, self correction, and range determination. The rectangular boxes appearing to the side of the illustrations represent the right and left hand photodetectors, and the circle and diamond within the rectangular boxes represent respectively the reference marker and the target scene images.

FIG. 3 is a simplified illustration of invention 10 used to demonstrate that exact initial alignment of first and second channel photodetector means 52 and 52' to the optical axes of their respective optical channels is unnecessary, and also to illustrate the calculation of separation constants for a particular range of interest, for example, optical infinity. The rectangular boxes to the bottom of this illustration represent the first and second channel photodetector means 52 and 52', and the circle and diamond symbols within the rectangular boxes are used to represent respectively the first and second channel reference marker images 34 and 34', and the first and second channel target images 40 and 40'.

Figure 4:
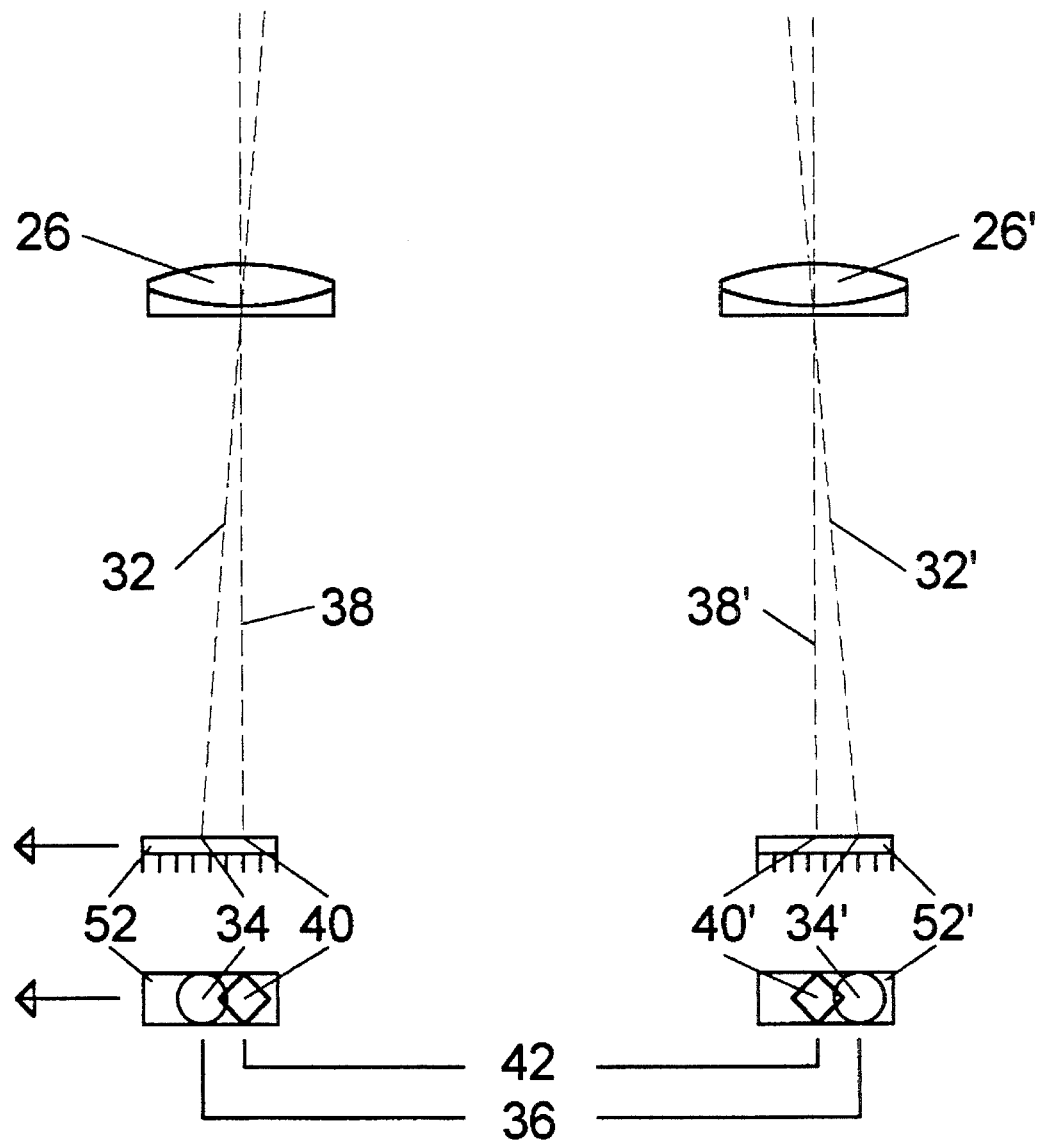

FIG. 4 is also a simplified illustration of invention 10 used to demonstrate the principle of self-correction should any element of first or second optical channels 12 or 12' including photodetector means 52 or 52' be disturbed in such a way as to introduce a lateral misalignment of either the reference marker images 34 and 34', or the target images 40 and 40'.

Figure 5:
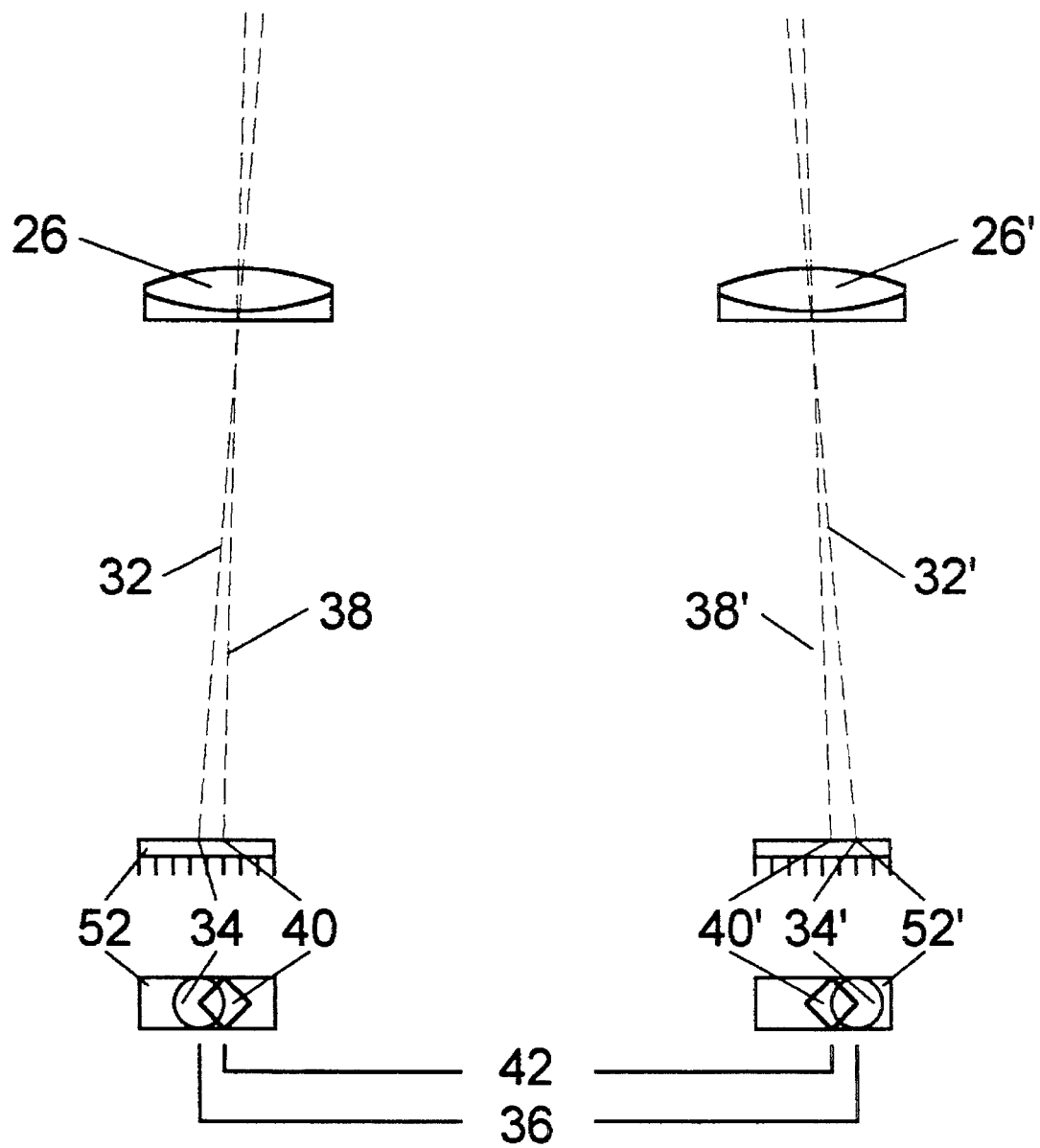

FIG. 5 is also a simplified illustration of invention 10 used to demonstrate the range calculation of a target following initial calibration.

OPERATION OF INVENTION

The operation of invention 10 begins with a description of operation of spatial referencing means 14 as it may be considered the meter, or yardstick, of the rangefinder.

Reference marker means 16 may be a light emitting diode (LED) with a small emitting surface, somewhere in the region of 20 to 30 microns in diameter. A small emitting surface is important to achieve relatively small reference marker images 34 and 34' formed on photodetector means 52 and 52'. Alternatively, a conventional LED may be used with a pin-hole placed in close proximity, or the LED emitting surface itself may be masked to the desired dimensions. Further, a low power laser diode may be used or other means of illumination. The next element is reference marker optics 18 which may be a lens set at one focal length from reference marker means 16. The purpose of this lens is to adjust the focus condition, or collimate reference marker means 16, to very nearly that of target beams 38 and 38'. Good collimation of reference marker means 16 is also important to insure the angular stability of marker beams 32 and 32' entering entrance windows 24 and 24'. Once collimated, the radiation from reference marker means 16 is then divided into first and second channel marker beams 32 and 32' by reference marker beam dividing means 20. The most simple form of beam dividing means 20 is a single glass wedge with two reflective sides mutually oriented at nearly 90 degrees. Although simple, beam dividing means 20 is a critical element to range accuracy and therefore the angle at which it divides radiation received from marker means 16 must remain very nearly constant regardless of thermal changes, or mechanical disturbances to avoid the requirement for recalibration of the device. Other forms of beam dividing means 20 are also possible including conventional dielectric coated cube beamsplitters or the like.

Once divided, marker beams 32 and 32' are directed respectively to first and second channel stable marker reflecting means 22 and 22' which are preferably small pentaprisms having the ability to reflect incident radiation largely at 90 degrees in spite of rotations in the plane formed by the incident and exiting beams. Spatial referencing means 14 is preferably positioned so that marker beams 32 and 32' will enter near an edge of first and second channel entrance windows 24 and 24'. Should objective lenses 26 and 26' be used as entrance windows 24 and 24' for example, it is preferable that marker beams 32 and 32' enter at either the lower or upper edge of these lenses. This will insure that in the exit pupils of the first and second channel eyepiece optics 54 and 54', the shadow cast by obscuring a portion of the objective lenses will not appear in the centre of the exit pupil, and be noticeable by the user in bright light conditions where the user's pupil is contracted.

All of the elements of spatial referencing means 14 may be mounted on a stable optical mounting means 28 such as a rigid plate, or stable portion of housing means 30.

Once exiting marker reflecting means 22 and 22', marker beams 32 and 32' enter their respective first and second optical channels 12 and 12' joining with their respective first and second channel target beams 38 and 38' which emanate from the sighted target of interest Marker beams 32 and 32', and target beams 38 and 38' are then directed to their respective photodetector means 52 and 52' and to their respective eyepiece optics 54 and 54' via first and second channel reflecting means 48 and 48', and first and second channel beamsplitting means 50 and 50'. Marker beams 32 and 32' will then form their respective first and second channel reference marker images 34 and 34' onto photodetector means 52 and 52'. Likewise, target beams 38 and 38' will form their respective first and second channel target images 40 and 40' onto photodetector means 52 and 52'.

Photodetector means 52 and 52' are preferably multiple pixel (picture element) photo-electric sensors such as CCD's (charge coupled devices), or linear photodiode arrays such as those marketed by EG&G Reticon of Sunnyvale, Calif. Multiple pixel photo-electric sensors permits the use of sub-pixel measurements of image separations by data processing techniques using image correlation algorithms. Typically, resolutions of image separations can be less than 0.01 pixel depending on correlation quality, noise, and spatial extent of the images on the sensors.

Power supply means 58 supports the power requirements of photodetector means 52 and 52', reference marker means 16, processor means 60, display means 64 and any other electronic sensors which may be used such as an electronic compass sensor, inclinometer, or others. The use of additional sensors will allow the calculation of parameters in addition to range, such as horizontal distance, height, magnetic bearing, point to point distance, surface area, target speed, and target magnetic bearing.

Electronic circuitry means 56 distributes electrical power as required and also transmits data between components as necessary. Photodetector means 52 and 52' transmits data to processor means 60 such as a microprocessor or microcontroller. which calculates range or other parameters. Parameters are then displayed on display means 64 such as an LED display or LCD, which may be conveniently placed in one image plane before one of the user's eyes. The user may also select various parameters or initiate one of the parameters via control means 62 either remotely mounted or mounted on housing means 30.

As photodetector means 52 and 52' see both reference marker images 34 and 34' and target images 40 and 40', means are employed to allow data from these images to be extracted separately to allow the separate measurement of separations of both the reference marker images 34 and 34', and the target images 40 and 40' across first and second photodetector means 52 and 52'.

As will become apparent by further description, the relationship of the mark separations 36 of the reference marker images 34 and 34' across photodetector means 52 and 52', and of the target image separations 42 of the target images 40 and 40' across photodetector means 52 and 52', permits the automatic calculation of target range, and provides automatic self-correction should elements be disturbed.

Scene reduction means 44 provides means for reducing the effect of target images 40 and 40' on photodetector means 52 and 52' to allow extraction of data from reference marker images 34 and 34'.

A preferred scene reduction means 44 is computational, whereby reference marker means 16 is modulated, off and on, in sequence with the exposure rate of photodetector means 52 and 52'. Successive subtractions of the photodetector data of the target scene with the reference marker on, from the target scene only, results in virtual elimination of the target scene data.

Another form of scene reduction means 44 is liquid crystal shutter 46. One form of shutter 46 is a "haze-free" shutter as described by Yang, Chien, and Doan in Applied Physics Letters, Vol. 60, No. 25, Jun. 22, 1992. This shutter is electrically addressable and exhibits two states; transmissive, or highly scattering. Positioned in the paths of first and second channel target beams 38 and 38' this form of shutter 46 may be used to randomize, or scatter target beams 38 and 38' when it is desirable to measure mark separations 36 across photodetector means 52 and 52'. In a clear, transmissive mode, this form of shutter 46 will permit measurements of target image separations across photodetector means 52 and 52'.

Other forms of shutter 46 are also possible such as a twisted nematic liquid crystal cell with polarizing films to provide a clear mode and a dark or absorbing mode. The use of polarizing filters which absorb large amounts of scene radiation is not desirable for at least binocular embodiments of invention 10.

The following description of range determination, calibration, and self correction refers to FIGS. 3, 4 and 5.

FIG. 3 is a simplified schematic representation of invention 10 used to illustrate initial insensitivity of the exact positioning of photodetector means 52 and 52', and to demonstrate the fundamentals of range calibration. Spatial reference means 14 is not shown but it is implied that marker beams 32 and 32' proceed from spatial reference means 14 and have a fixed lateral angular relationship. To simplify the description of operation, other non-essential elements are also not shown including reflecting means 48 and 48', beamsplitting means 50 and 50', and eyepiece optics means 54 and 54'.

Assuming now a target at long distance, or optical infinity where the target beams 38 and 38' are essentially parallel, photodetector means 52 and 52' should be nearly, but not necessarily exactly centered on the optical axes of target beams 38 and 38'. Using for example, linear photodiode arrays as photodetector means 52 and 52', each with 256 pixels, first channel photodetector means 52 may be centered on the optical axis of first channel target beam 38, at pixel number 128.00. Second channel photodetector means 52' however may be positioned right of center in relation to the optical axis of second channel target beam 38', at pixel number 114.05. When target image separation 42 is then measured across photodetector means 52 and 52', a non-zero result of −13.95 pixels will result which, as will become apparent, will have little consequence to the measurement of target range. Marker beams 32 and 32' are deliberately drawn non-parallel to illustrate that no demands are made on spatial referencing means 14 to insure that marker beams 32 and 32' be parallel.

For each particular range of the target object of interest, a constant difference between mark separation 36, and target separation 42 will result. For example, for a target at great distance, or optical infinity, the target image separation 42, (herein symbolized as $T_s$), across photodetector means 52 and 52' is in this example −13.95 pixels. The measured mark separation 36, (herein symbolized as $M_s$), across photodetector means 52 and 52' is for example 21.25 pixels. The difference between mark separation 36 and target image separation 42 in this example will result in the infinity calibration constant herein referred to as $I_c$.

$$T_s - M_s = I_c$$

$$-31.95 - 21.25 = -35.20 \text{ pixels} = I_c$$

This particular infinity constant $I_c$ will not change regardless of disturbances of elements introducing lateral image movements of images across photodetector means 52 and 52'.

Should, for example as illustrated by FIG. 4, first photodetector means 52 be disturbed, and moved to the left as viewed, by say 1.15 pixels, the following recalculation of $I_c$ will result:

$$T_s - M_s = I_c$$

$$(-13.95 - 1.15) - (21.25 - 1.15) = 35.20 \text{ pixels} = I_c$$

This principle of self-correction also applies for targets at ranges other than optical infinity as disturbances which produce lateral movement of images on photodetector means 52 and 52' will not affect the range constants, or differences between mark separations 36, and target separations 42.

Once invention 10 has been range calibrated using a target of known distance, these calibration constants may be stored electronically and used as a reference for targets at differing ranges as will now be demonstrated.

FIG. 5 presents an example of a target ranged at a distance closer than optical infinity. Once the new target has been sighted, or appears in the field of view of photodetector means 52 and 52', new mark separations 36 and target image separations 42 may be measured which will result in a new range constant as previously described. The difference between this new range constant, and the stored infinity contact $I_c$ will result in the actual target image separation. Thus, for this nearer target we have for example:

$$M_s = 20.10 \text{ pixels}$$

$$T_s = -13.85 \text{ pixels}$$

$$I_c = -35.20 \text{ pixels}$$

Calculation of the actual target image separation is then:

$$T_s - M_s - I_c = \text{actual target image separation,}$$

or $$-13.85 - 20.10 - (-35.20) = 1.25 \text{ pixels}$$

The actual target image separation can then be used to directly calculate angle of parallax of the target and thereby range, by the following:

$$O = \frac{(T_s - M_s - I_c)Px}{EFL}$$

and $R = \frac{B}{O}$ where:
O = target angle of parallax in radians
$M_s$ = mark separation 36 in pixels
$T_s$ = target separation 42 in pixels
$I_c$ = measured infinity constant in pixels
Px = pixel width in millimeters
EFL = effective focal length to photodetector means 52 and 52'
R = range in meters
B = baselength, or center to center separation of entrance windows 24 and 24' or objective lenses, in meters From the preceding example where actual target image separation is measured as 1.25 pixels, the calculation of range is as follows:

$$Px = .025 \text{ millimeters}$$
$$EFL = 400 \text{ millimeters}$$
$$B = .190 \text{ meters}$$
$$O = \frac{(1.25)(.025)}{400} = 7.81 \times 10^{-5} \text{ radians}$$
$$R = \frac{.190}{7.81 \times 10^{-5}} = 2.43 \times 10^3 \text{ meters}$$

In addition to self correction, invention 10 also performs simultaneous capture of target images 40 and 40' respectively on photodetector means 52 and 52'. It is essential to capture target images 40 and 40' simultaneously wherever these images are changing with respect to photodetector means 52 and 52' as a result of hand tremor, target motion, or even air turbulence. All of these affects will produce blur on photodetector means 52 and 52' which may be beneficial (as image information is spread across a larger number of pixels), providing the blur is symmetric for both first and second channel photodetector means 52 and 52'. By capturing target images simultaneously, symmetry may be assured for all image movements, providing blur is not so severe as to eliminate useful contrast, and is even beneficial in reducing the effects of air turbulence between marginally separated air pathways extending from entrance windows 24 and 24' out to the target of interest.

This and other advantages will become self-evident from the following example of an initial range self-calibration of invention 10 to a very distant target at optical infinity (in practical terms, the distance where the instrument resolution cannot distinguish the target distance from infinity), such as distant mountains, or celestial targets such as the moon, or a simulated target collimated at optical infinity.

The following therefore, is an example of the main data capture events, and data processing which may be used to measure mark separations 36 and target image separations 42, which are used in the calculation for target angle of parallax.

Data Capture Events (not necessarily in order given):
1. Target is sighted at optical infinity, i.e., parallax angle is essentially zero.
2. Exposure rates are set on photodetector means 52 and 52' for best signal level.
3. Target images 40 and 40' are captured simultaneously, respectively on photodetector means 52 and 52'.
4. Scene reduction means 44 is applied.
5. Reference marker means 16 is applied.

6. Exposure rates are reset if necessary on photodetector means 52 and 52' for capture of reference marker images 34 and 34'.

7. Reference marker images 34 and 34' are captured respectively on photodetector means 52 and 52'.

Data Processing:

1. Raw data from reference marker images 34 and 34' and target images 40 and 40' is filtered to reduce certain spatial frequency artifacts such as quantization or sampling noise.

2. For the measurement of mark separations 36 using filtered data from marker images 34 and 34', the following may be used:
   a) Integer pixels based on simple intensity comparison to obtain coarse separations.
   b) Compute discrete cross-correlations, then interpolate to find accurate location of maximum to refine measured coarse separations.

3. For the measurement of target image separations 42 using filtered data from target images 40 and 40', the following may be used:
   a) Correlate data over defined region of photodetector means 52 and 52', and over defined limits of correlation shift to find correlation maximum.
   b) Interpolate around maximum to find sub-pixel maximum.

4. Difference in mark separation 36 and target image separation 42 ($|(M_s-T_s)|$) results in infinity constant $I_c$, and is stored for use in future range measurement operations.

Once a self calibration routine has been completed, the user may then range other targets. Note that the calibration constant need not necessarily be at infinity. Infinity is only convenient in that a parallax angle of zero may be presumed. Calibration at particular distances of known parallax angles may also be convenient such as 50 or 100 meters as may be accomplished following manufacture and assembly.

In summary, invention 10 offers many advantages and improvements over the prior art. It allows the production of low cost, highly accurate and resilient rangefinding products, especially those configured as binoculars.

Low production costs are achievable as the system has no moving parts involved in range calculation, and a simple "binocular like" optical system.

Products developed from this ranging system will also be easy to use as "point and shoot", not requiring fine alignment of images by the user.

Excellent ranging performance is achieved through the use of a simple self correction system making the system suitable for normal rough field use. High accuracy and fast ranging is achieved using a simple and effective photoelectric system and data processing techniques to reliably measure image separations and thereby target range down to a small fraction of a pixel width.

Finally, the system permits simultaneous capture of target images, and is therefore insensitive to the many sources of blur such as target motion, hand tremor, air turbulence, image defocussing, and optical aberrations which are symmetric between the two photodetectors.

The preceding description serves to describe the main objects and advantages of invention 10. The scope of the invention however should not be determined by the embodiments illustrated, but by the appended claims and their legal equivalents.

I claim:

1. A self correcting stereoscopic auto-rangefinding device comprising: spatial referencing means, for producing first and second channel marker beams of radiation having a mutual and laterally stable angular relationship; first and second channel entrance windows, for receiving said first and second channel marker beams of radiation from said spatial referencing means, and for receiving first and second channel target beams of radiation from a target object of interest;

first and second channel objective lenses, for forming first and second channel marker images and first and second channel target images respectively from said first and second channel marker beams, and said first and second channel target beams;

first channel photodetector means, for sensing said first channel marker images, and said first channel target images;

second channel photodetector means, for sensing said second channel marker images, and said second channel target images;

correlation means, for measuring mark separations between said first and second channel photodetector means, of said first and second channel reference marker images, and for measuring target image separations between said first and second channel photodetector means, of said first and second channel target images;

calculation means, for the determination of at least one calibration constant of a target with a known angle of parallax, whereby the difference between a mark separation and a target scene separation of a first target of known angle of parallax results in a calibration constant of a particular separation value, which when used with the difference of a mark separation and a target scene separation of a second target, will result in a separation value then used to calculate the angle of parallax of said second target.

2. The device as recited in claim 1, further comprising a scene reduction means, whereby the effect on said first photodetector means of said first channel target image is reduced relative to said first channel reference marker image.

3. The device as recited in claim 2 wherein said scene reduction means includes a liquid crystal shutter.

4. The device as recited in claim 2 wherein said scene reduction means comprises: computational means whereby said first channel marker beam is modulated in sequence with the capture rate of said first channel photodetector means such that said first channel target image data is largely subtracted, thereby reducing the effect of said first channel target image on said first channel photodetector means, relative to that of said first channel marker image.

5. A method for determining a parameter relating to a target object of interest using a stereoscopic auto-rangefinding device, comprising the steps of:

sighting said target object of interest;

producing first and second channel marker beams having a mutual and laterally stable angular relationship;

receiving first and second channel target beams of radiation from said target object of interest;

forming first and second channel reference marker images from respectively said first and second channel marker beams, onto respectively first and second channel photodetector means;

forming first and second channel target images from respectively said first and second channel target beams, onto respectively said first and second channel photodetector means;

detecting information relating to the separation of said first and second channel reference marker images and information relating to the separation of said first and second channel target images, between said first and second channel photodetector means.

6. The method as recited in claim 5 wherein the step of detecting includes the following sub-steps:

a) calculation of at least one calibration constant, whereby the difference between the said separation of said first and second channel reference marker images and the said separation of said first and second channel target images of a first sighted target of known angle of parallax provides a calibration constant of a particular separation value;

b) calculation of an unknown angle of parallax of a second sighted target, whereby the difference between the said separation of said first and second channel reference marker images, and the said separation of said first and second channel target images of a second sighted target, will, upon application of said at least one calibration constant as determined by sub-step a), result in a separation value then used to directly calculate the angle of parallax of said second sighted target.

* * * * *